Patented Jan. 1, 1952

2,580,857

UNITED STATES PATENT OFFICE 2,580,857

VULCANIZATION OF RUBBERY BUTADIENE-STYRENE COPOLYMERS

Omar H. Smith, West Englewood, N. J., assignor to United States Rubber Company, New York, N. Y., a corporation of New Jersey No Drawing. Application January 18, 1951, Serial No. 206,727

4 Claims. (Cl. 260—79.5)

This invention relates to improved rubber-like vulcanizates of butadiene-styrene rubbery copolymers and more particularly to such vulcanizates having improved resistance to cut growth after aging.

A serious deficiency of rubber-like vulcanizates of butadiene-styrene rubbery copolymers compounded by conventional methods has been that they are deficient in cut growth resistance, especially after aging, giving performance which is quite inferior to that of natural rubber insofar as cut growth resistance is concerned. Another problem which has been encountered with rubber-like vulcanizates of butadiene-styrene rubbery copolymers has been that such vulcanizates, particularly when compounded so as to be soft when used at low temperatures such as those encountered in the arctic, as for gasket use, have exhibited a marked tendency to crystallize at such temperatures, thereby becoming hard and wholly unsuitable for their intended use. Some butadiene-styrene vulcanizates compounded for arctic use have been what is known as "borderline" with respect to crystallization, i. e., under certain conditions they crystallize but under other conditions they do not crystallize. It is impossible to use such "borderline" compounds because the conditions to which they are subjected in use cannot be controlled.

Gasket compounds for arctic use must meet specifications with respect to:

(1) Room temperature tensile strength and elongation.
(2) Percent deterioration of tensile and elongation upon oven aging.
(3) Unaged and aged hardness.
(4) Oven-aged compression set.
(5) Compression set at −35° F.

It is difficult to obtain adequate tensile and elongation and at the same time obtain adequate softness. Even a slight tendency in the copolymer to crystallize produces excessively high cold-compression set in gasket compounds. Increasing the sulfur above the normal levels has been proposed as a means of eliminating crystallization in polymers which are borderline with respect to crystallization. However, it is impossible, when conventional compounding principles are followed, to increase the sulfur sufficiently to eliminate crystallization without objectionably deteriorating the oven-aged tensile and elongation.

One object of the present invention is to provide a method of greatly increasing the resistance to cut growth of rubber-like vulcanizates of butadiene-styrene rubbery copolymers. Another object is to provide a means of obtaining vulcanizates which have the softness required for gasket use under arctic conditions, without deterioration of other physical properties. Another object is to provide a means of employing high strength "arctic" type copolymers of butadiene and styrene which are borderline with respect to crystallization and which could not be employed successfully for gaskets or similar uses when known compounding techniques were used.

I have discovered that the foregoing difficulties can be overcome by reducing the zinc oxide content of compounds comprising a rubbery copolymer of butadiene and styrene, sulfur and an organic vulvanization accelerator, from the levels customarily used to amounts ranging from 0.3 to 0.7% by weight based on the weight of the butadiene-styrene rubbery copolymer. Such reduction of the zinc oxide content reduces the hardness to such an extent that it is possible to use the vulcanizate for gasket or like purposes under arctic conditions and yet to obtain adequate tensile strength, elongation and other physical properties. At the same time the cut growth resistance of the vulcanizate is greatly increased, especially after aging. The tensile and elongation at break are substantially improved, as is the abrasion resistance. The principles of the invention can be employed to yield softer vulcanizates without deterioration of the physical properties. The invention also can be used to eliminate crystallization tendencies and is particularly valuable in polymers which are borderline with respect to crystallization.

In accordance with the invention, the zinc oxide level ranges from 0.3 to 0.7% based on the butadiene-styrene copolymer. While any level within this range can be used, a level of 0.5% zinc oxide based on the rubber gives the greatest effect and is preferred.

Any rubbery copolymer of butadiene and styrene can be used in the practice of my invention. Such rubbery copolymers commonly contain from 60 to 90% by weight of combined butadiene and correspondingly from 40 to 10% by weight of combined styrene, these percentages being based on the sum of butadiene and styrene. Such rubbery copolymers are commonly known as "GR-S." More commonly they contain from 70 to 80% butadiene and 30 to 20% styrene. The invention is applicable with standard GR-S as well as with special types of GR-S such as so-called "cold rubber" which is produced at temperatures of 41° F. and lower.

In practicing the invention, I use an amount of sulfur ranging from 0.5 to 3.0% by weight based on the rubbery copolymer. I prefer, particularly with the so-called borderline copolymers, to use a sulfur level in the higher portion of this range, i. e., from 2 to 3% based on the copolymer. The amount of sulfur used will also depend upon the choice of accelerator and the amount of accelerator. Those skilled in the art will be readily enabled to obtain my new results by following the teachings of this disclosure.

Any organic accelerator capable of accelerating the sulfur vulcanization of butadiene-styrene rubbery copolymers can be used in the practice of the present invention. The invention is not limited to the use of any particular organic accelerator. I generally use conventional accelerators such as MBT (mercapto benzothiazole), DPG (diphenylguanidine) or "Monex" (tetramethylthiuram monosulfide).

Curing of the compounds of my invention can be carried out at temperatures between 250° F. and 325° F. However, a curing temperature of about 292° F. is preferred and is generally employed. The curing time can be varied according to the type and quantity of organic accelerators used. A typical cure is 45 minutes at 292° F.

The following examples illustrate my invention more fully.

EXAMPLE 1

Compounds A, B, O, P, Q and R were prepared, the formulations being as indicated in Tables Ia and Ib. Formulations A and B are identical except that the zinc oxide content is 5% on the rubber in compound A, and 0.5% in compound B. The same applies to compounds O and P and to compounds Q and R. It can be readily seen by examination of the tables that compounds B, P and R are a distinct improvement over compounds A, O, and Q, respectively, most notably in respect to aged cut growth.

Table Ia

| Code | A | B |
|---|---|---|
| (Cured 45 min. at 292° F.) | | |
| Standard GR-S (76.5% C₄H₆, 23.5% styrene) | 100 | 100 |
| Easy Processing Channel Black | 50 | 50 |
| Asphaltum | 5 | 5 |
| MBT | 1.5 | 1.5 |
| DPG | 0.4 | 0.4 |
| Sulfur | 2.0 | 2.0 |
| Zinc Oxide | 5.0 | 0.5 |

| Code | A | B |
|---|---|---|
| Tensile, R. T. p. s. i. | 1,700 | 2,400 |
| Per Cent Elongation | 420 | 500 |
| 200% Stress, p. s. i. | 510 | 530 |
| Aged 200% Stress, p. s. i. | 1,075 | 975 |
| Cut Growth Resist. R. T., kc./in. | 378 | 345 |
| Aged cut growth Resist. R. T. kc./in.[1] | 90 | 153 |

[1] Aged 24 hrs. at 212° F.

Table Ib

| Code | O | P | Q | R |
|---|---|---|---|---|
| (Cured 45 min. at 292° F.) | | | | |
| Rubbery Copolymer of 90% butadiene and 10% styrene, made at 41° F. | 100 | 100 | 100 | 100 |
| Easy Processing Channel Black | 50 | 50 | 50 | 50 |
| Asphaltum | 5 | 5 | 5 | 5 |
| Stearic acid | 1.5 | 1.5 | 1.5 | 1.5 |
| Sulfur | 0.7 | 0.7 | 2.0 | 2.0 |
| "Monex" | 2.0 | 2.0 | 0.7 | 0.7 |
| Zinc oxide | 5.0 | 0.5 | 5.0 | 0.5 |

| Code | O | P | Q | R |
|---|---|---|---|---|
| Tensile, R. T., p. s. i. | 2,900 | 2,500 | 2,100 | 2,700 |
| Elong. R. T. per cent | 660 | 770 | 530 | 510 |
| 200% Stress, p. s. i. | 370 | 275 | 350 | 210 |
| Aged 200% Stress, p. s. i. | 600 | 400 | 950 | 375 |
| Abrasion rating | 83.9 | 64.5 | 109 | 89.2 |
| Cut Growth Resist., R. T., kc./in. | 403 | 615 | 190 | 359 |
| Aged Cut Growth Resist., R. T. kc./in. | 174 | 424 | 70.5 | 150 |

Normally effective levels of sulfur may be used in the compounding technique of my invention. Generally, I have used 2 parts of sulfur per 100 of rubber. However, concentrations between 0.5 and 3.0 are effective. Table Ib indicates the improvement obtainable with stocks containing low amounts of sulfur and low amounts of zinc oxide. Changing the sulfur concentration necessitates changing the amount of accelerator, e. g., it has been found that MBT can be used in concentrations between 0.5 and 2.0 parts per 100 of rubber, and DPG between 0.2 and 0.6 part per 100 of rubber. When "Monex" is the accelerator, concentrations of 0.5 to 2.5 parts per 100 of rubber are effective, depending on the proportion of sulfur employed, the higher amounts of "Monex" being used with the lower proportions of sulfur.

EXAMPLE 2

Compounds C, D, E, F, G and H were formulated to indicate the effect of varying the sulfur concentration effective in this invention. The amounts of sulfur used were 2.0, 2.5 and 3.0 parts per 100 of rubber. Generally, the properties of the compound have been improved by the restricted amounts of zinc oxide used. Outstanding are the improvements in cut growth resistance after aging. However, other improvements are also apparent, i. e., tensile and breaking elongation.

Table II

| Code | C | D | E | F | G | H |
|---|---|---|---|---|---|---|
| (Cured 45 min. at 292° F.) | | | | | | |
| Rubbery Copolymer of 90% butadiene and 10% styrene, made at 41° F. | 100 | 100 | 100 | 100 | 100 | 100 |
| Easy Processing Channel Black | 50 | 50 | 50 | 50 | 50 | 50 |
| Asphaltum | 5 | 5 | 5 | 5 | 5 | 5 |
| MBT | 1.5 | 1.5 | 1.5 | 1.5 | 1.5 | 1.5 |
| DPG | 0.4 | 0.4 | 0.4 | 0.4 | 0.4 | 0.4 |
| Sulfur | 2.0 | 2.0 | 2.5 | 2.5 | 3.0 | 3.0 |
| Zinc oxide | 5.0 | 0.5 | 5.0 | 0.5 | 5.0 | 0.5 |

| Code | C | D | E | F | G | H |
|---|---|---|---|---|---|---|
| Tensile, R. T. p. s. i. | 2,300 | 2,800 | 2,200 | 2,600 | 2,400 | 2,300 |
| Per Cent Elongation | 490 | 580 | 460 | 510 | 390 | 480 |
| 200% Stress, p. s. i. | 550 | 450 | 630 | 560 | 800 | 575 |
| Aged 200% Stress, p. s. i. | 1,030 | 850 | 1,225 | 1,000 | 1,500 | 1,130 |
| Cut Growth, R. T., kc./in. | 242 | 382 | 184 | 270 | 103 | 326 |
| Aged Cut Growth, R. T. kc./in.[1] | 63 | 133 | 15 | 55 | 10 | 41 |

[1] Aged 24 hrs. at 212° F.

EXAMPLE 3

The advantages of the low zinc oxide concentrations of my invention are further illustrated by Table III showing compounds with the zinc oxide ranging from 5% down to none. The optimum advantages are obtained at 0.5 part of zinc oxide per 100 of rubber. Reduction of zinc oxide below 0.3 part per 100 of rubber is done at a sacrifice of properties, and is undesirable. Improved results at a concentration of 0.5% of zinc oxide are evident in tensile, elongation, abrasion rating, and especially in cut growth resistance after aging.

Table III

| Code | I | J | K | L | M | N |
|---|---|---|---|---|---|---|
| (Cured 45 minutes at 292° F.) | | | | | | |
| GR-S 10 (like standard GR-S except containing rosin acid instead of fatty acid) | 100 | 100 | 100 | 100 | 100 | 100 |
| Easy Processing Channel Black | 50 | 50 | 50 | 50 | 50 | 50 |
| Asphaltum | 5 | 5 | 5 | 5 | 5 | 5 |
| MBT | 1.5 | 1.5 | 1.5 | 1.5 | 1.5 | 1.5 |
| DPG | 0.4 | 0.4 | 0.4 | 0.4 | 0.4 | 0.4 |
| Sulfur | 2.0 | 2.0 | 2.0 | 2.0 | 2.0 | 2.0 |
| Zinc Oxide | 5.0 | 3.0 | 1.0 | 0.5 | 0.3 | 0.0 |

| Code | I | J | K | L | M | N |
|---|---|---|---|---|---|---|
| Tensile, R. T., p. s. i. | 1,700 | 2,100 | 2,200 | 2,400 | 2,300 | 2,410 |
| Per Cent Elongation, R. T. | 420 | 440 | 460 | 500 | 520 | 630 |
| Abrasion rating | 67.9 | 68.6 | 73 | 71 | 73.5 | 68.9 |
| 200% Stress, p. s. i. | 510 | 580 | 510 | 530 | 720 | 430 |
| Aged 200% Stress, p. s. i. | 1,075 | 1,275 | 1,000 | 975 | 1,300 | 625 |
| Cut Growth Resist., R. T. kc./in. | 378 | 365 | 377 | 345 | 410 | 569 |
| Aged Cut Growth Resist., R. T. kc./in. | 90 | 43 | 94 | 153 | 52 | 103 |

EXAMPLE 4

The manner in which my invention can be used to obtain a proper balance between hardness and low temperature compression set in gasket stocks is illustrated in Table IV. The maximum allowable compression set in a hatch gasket designed for arctic use is 40% measured after storage at −35° F. for 94 hours. The minimum P & J hardness reading at room temperatures must be 1.40 mm. (the higher the P & J reading, the softer the stock).

Compound AA in which 5 parts zinc oxide is employed in a stock cured with 0.7 part sulfur has an adequately high P & J reading (1.44 mm.) but fails to meet the limitation on low temperature compression set. Compound AB in which the sulfur is increased to 2 parts without changing the proportion of zinc oxide meets the low temperature compression set limit but fails to meet the hardness limitation. Compound AC in which 2 parts sulfur is used and the zinc oxide is reduced to 1 part still fails to meet the hardness limitation. However, compound AD employing 2 parts of sulfur and a proportion of zinc oxide (0.5 part) within the limits of this invention meets both the hardness and compression set limitations.

The advantage of reducing zinc oxide in compounds based on the standard "cold" rubber X-432 (71 butadiene/29 styrene, made at 41° F.) is illustrated in compounds AE and AF. Compound AE containing 5 parts zinc oxide has adequately low compression set but is too hard to meet the specifications. Reducing zinc oxide to 0.5 part in this compound without any other modification produced a stock which meets both low temperature compression set and hardness specifications. In addition, the relation between unaged and aged tensiles and elongations has been much improved by reducing zinc oxide to 0.5 part. Also, oven aged compression set has been significantly improved.

Table IV

| | AA | AB | AC | AD | AE | AF |
|---|---|---|---|---|---|---|
| GR-S (85% Butadiene and 15% styrene) [1] | 100 | 100 | 100 | 100 | | |
| GR-S (71% Butadiene and 29% styrene) [1] | | | | | 100 | 100 |
| Trioctyl phthalate | 15 | 15 | 15 | 15 | 16 | 16 |
| Carbon Black (HAF) | 40 | 40 | 40 | 40 | 40 | 40 |
| Asphaltum | 5 | 5 | 5 | 5 | 5 | 5 |
| Stearic acid | 1.5 | 1.5 | 1.5 | 1.5 | 1.5 | 1.5 |
| Sulfur | 0.7 | 2 | 2 | 2 | 0.7 | 0.7 |
| Monex | 2 | 0.7 | 0.7 | 0.7 | 2 | 2 |
| Zinc Oxide | 5 | 5 | 1 | 0.5 | 5 | 0.5 |

[1] Made at 41° F.

| | AA | AB | AC | AD | AE | AF |
|---|---|---|---|---|---|---|
| (Cured 45' at 292° F.) | | | | | | |
| Unaged tensile, p. s. i. | 2,170 | 1,350 | 1,760 | 2,210 | 2,500 | 2,900 |
| Unaged elongation, per cent | 560 | 360 | 400 | 490 | 540 | 670 |
| Aged tensile, p. s. i. [2] | 1,720 | 1,350 | 1,700 | 1,790 | 2,100 | 3,000 |
| Aged Elongation, per cent [2] | 430 | 280 | 370 | 390 | 460 | 700 |
| Aged compression set, per cent [2] | 28 | 28.6 | 27.1 | 28.6 | 24.2 | 17.5 |
| 300% Stress, p. s. i. | 675 | 1,120 | 895 | 825 | 775 | 550 |
| P & J hardness, mm. | 1.44 | 1.12 | 1.17 | 1.43 | 1.34 | 1.59 |
| Low Temperature Compression Set [3] | 62.7 | 28.4 | 28.7 | 37.6 | 20.8 | 31.4 |

[2] Oven aged 94 hours at 292° F.
[3] Measured after storage for 94 hrs. at −35° F.

Having thus described my invention, what I claim and desire to protect by Letters Patent is:

1. A vulcanizate of a mixture of a rubbery copolymer of butadiene and styrene, sulfur in amount ranging from 0.5 to 3.0% by weight based on said copolymer, an organic vulcanization accelerator, and zinc oxide in amount ranging from 0.3 to 0.7% by weight based on said copolymer.

2. A vulcanizate of a mixture of a rubbery copolymer of butadiene and styrene, sulfur in amount ranging from 2.0 to 3.0% by weight based on said copolymer, an organic vulcanization accelerator, and zinc oxide in amount equal to 0.5% by weight based on said copolymer.

3. The process which comprises vulcanizing a mixture of a rubbery copolymer of butadiene and styrene, sulfur in amount ranging from 0.5 to 3.0% by weight based on said copolymer, an organic vulcanization accelerator, and zinc oxide in amount ranging from 0.3 to 0.7% by weight based on said copolymer.

4. The process which comprises vulcanizing a mixture of a rubbery copolymer of butadiene and styrene, sulfur in amount ranging from 2.0 to 3.0% by weight based on said copolymer, an organic vulcanization accelerator, and zinc oxide in amount equal to 0.5% by weight based on said copolymer.

OMAR H. SMITH.

REFERENCES CITED

The following references are of record in the file of this patent:

UNITED STATES PATENTS

| Number | Name | Date |
|---|---|---|
| 2,473,016 | Davis | June 14, 1949 |